(12) United States Patent
Benning et al.

(10) Patent No.: US 10,029,718 B2
(45) Date of Patent: Jul. 24, 2018

(54) MODULAR CART

(71) Applicant: Carlisle FoodService Products, Incorporated, Oklahoma City, OK (US)

(72) Inventors: Martin Benning, Edmond, OK (US); Herve Boeglin, Aurora, IL (US); Kevin Lochner, Maple Grove, MN (US); Robert Lee Prickett, Colma, CA (US); Lars Runquist, Inver Grove Heights, MN (US)

(73) Assignee: Carlisle FoodService Products, LLC, Oklahoma City, OK (US)

( * ) Notice: Subject to any disclaimer, the term of this patent is extended or adjusted under 35 U.S.C. 154(b) by 0 days.

(21) Appl. No.: 15/156,096

(22) Filed: May 16, 2016

(65) Prior Publication Data

US 2016/0332651 A1    Nov. 17, 2016

Related U.S. Application Data

(60) Provisional application No. 62/162,564, filed on May 15, 2015.

(51) Int. Cl.
*B62B 3/02* (2006.01)
*B62B 3/00* (2006.01)

(52) U.S. Cl.
CPC .............. *B62B 3/005* (2013.01); *B62B 3/004* (2013.01); *B62B 3/02* (2013.01)

(58) Field of Classification Search
CPC ........... B62B 3/00; B62B 3/002; B62B 3/003; B62B 3/004; B62B 3/005; B62B 3/006; B62B 3/02
See application file for complete search history.

(56) References Cited

U.S. PATENT DOCUMENTS

| | | | | | |
|---|---|---|---|---|---|
| 3,061,396 | A | * | 10/1962 | Hock | A47B 43/02 312/258 |
| 3,999,775 | A | * | 12/1976 | Brongo | B62B 3/003 211/187 |
| 4,045,104 | A | * | 8/1977 | Peterson | A47B 47/03 211/182 |
| 4,786,122 | A | * | 11/1988 | Nichoalds | A47B 47/05 312/249.8 |
| 5,011,240 | A | * | 4/1991 | Kelley | A47B 31/00 312/249.12 |
| 5,048,902 | A | * | 9/1991 | Daly | A47B 47/042 312/249.8 |
| 5,069,466 | A | * | 12/1991 | Propst | A47B 31/00 211/186 |
| 5,259,668 | A | * | 11/1993 | Teufel | B62B 3/006 312/249.11 |

(Continued)

OTHER PUBLICATIONS

Images from Carlisle FoodService Products Catalog 2015-2016, pp. 152-163.
Images from Caddy Corporation catalog, 2014.

*Primary Examiner* — Jacob B Meyer
(74) *Attorney, Agent, or Firm* — McAfee & Taft

(57) ABSTRACT

A food tray cart is easily constructed utilizing threaded fasteners. The cart has corner posts that removably connect to a top and bottom, and side panels and a rear door panel that are slidably received in the corner posts. A door is hingedly connected to the top and bottom.

12 Claims, 16 Drawing Sheets

(56) References Cited

U.S. PATENT DOCUMENTS

| | | | | |
|---|---|---|---|---|
| 5,282,678 | A * | 2/1994 | Teufel | B62B 3/006 312/107.5 |
| 5,605,344 | A * | 2/1997 | Insalaco | A47B 47/02 280/47.34 |
| 5,647,650 | A * | 7/1997 | Daugherty | A47B 57/565 108/180 |
| 5,651,596 | A * | 7/1997 | Carlson | A47B 88/90 220/533 |
| 5,673,983 | A * | 10/1997 | Carlson | A47B 67/04 312/218 |
| 5,673,984 | A * | 10/1997 | Insalaco | A47B 47/02 312/108 |
| 5,716,116 | A * | 2/1998 | Carlson | A47B 47/05 312/280 |
| 5,803,559 | A * | 9/1998 | Carlson | E05B 65/462 312/216 |
| 5,805,075 | A * | 9/1998 | Carlson | A61G 12/001 312/215 |
| 5,915,803 | A * | 6/1999 | Daugherty | A47B 46/00 312/263 |
| 5,975,660 | A * | 11/1999 | Tisbo | A47B 47/045 312/108 |
| 6,086,073 | A * | 7/2000 | Tisbo | B25H 1/02 280/47.26 |
| 6,401,940 | B1 * | 6/2002 | Hartel | H02B 1/301 211/182 |
| 6,802,158 | B1 * | 10/2004 | Greene | E04H 1/1205 52/270 |
| 7,134,552 | B1 | 11/2006 | McDonagh et al. | |
| 7,544,915 | B2 * | 6/2009 | Hu | B62B 3/006 219/387 |
| D637,373 | S | 5/2011 | Benning et al. | |
| 8,360,447 | B2 * | 1/2013 | Knoppers | A47B 31/00 280/47.34 |
| 8,465,030 | B2 * | 6/2013 | Boivin | B62B 3/004 280/47.34 |
| 8,596,654 | B2 * | 12/2013 | Belanger | B62B 3/004 280/47.34 |
| 8,690,170 | B2 * | 4/2014 | Belanger | B29C 70/86 280/47.34 |
| 9,126,613 | B2 * | 9/2015 | Savage | B62B 3/108 |
| 9,180,897 | B2 * | 11/2015 | Boivin | B62B 3/004 |
| 9,303,912 | B1 * | 4/2016 | Schalla | A47B 96/021 |
| 9,655,307 | B2 * | 5/2017 | Burmann | A01G 9/02 |
| 9,751,547 | B2 * | 9/2017 | Davison, Jr. | B62B 3/002 |
| 2001/0045718 | A1 * | 11/2001 | Boirum | B25H 3/02 280/47.26 |
| 2002/0130598 | A1 * | 9/2002 | Schmidt | A47B 46/00 312/324 |
| 2005/0144858 | A1 * | 7/2005 | Bothun | A47B 53/02 52/79.1 |
| 2006/0255699 | A1 * | 11/2006 | Punzel | A47B 81/005 312/217 |
| 2007/0069491 | A1 * | 3/2007 | Ferraro | A47B 87/02 280/79.11 |
| 2007/0145870 | A1 * | 6/2007 | Uffner | A47B 31/00 312/257.1 |
| 2010/0140890 | A1 * | 6/2010 | Boivin | B62B 3/003 280/47.34 |
| 2010/0170287 | A1 * | 7/2010 | Boss | A47B 31/02 62/441 |
| 2011/0025006 | A1 * | 2/2011 | Knoppers | A47B 31/00 280/47.34 |
| 2011/0042910 | A1 * | 2/2011 | Ceballos-Godefroy | A47B 31/04 280/42 |
| 2011/0233882 | A1 * | 9/2011 | Belanger | B62B 3/003 280/47.35 |
| 2011/0278879 | A1 * | 11/2011 | Belanger | B29C 70/86 296/187.01 |
| 2013/0181419 | A1 | 7/2013 | Benning et al. | |
| 2013/0221820 | A1 * | 8/2013 | Chang | B25H 3/02 312/330.1 |
| 2013/0241165 | A1 * | 9/2013 | Boivin | B62B 3/003 280/79.2 |
| 2014/0021690 | A1 * | 1/2014 | Burd | B62B 3/003 280/47.35 |
| 2014/0318156 | A1 * | 10/2014 | Richardson | B64D 11/04 62/56 |
| 2014/0352929 | A1 * | 12/2014 | Wu | A47B 31/06 165/104.34 |
| 2015/0040606 | A1 * | 2/2015 | Hernanz Arbeloa | B62B 3/006 62/457.1 |
| 2015/0191192 | A1 * | 7/2015 | Savage | B62B 3/108 280/47.35 |
| 2016/0270527 | A1 * | 9/2016 | Winter | B64D 11/0007 |
| 2016/0288909 | A1 * | 10/2016 | Boivin | E05C 9/046 |
| 2016/0290023 | A1 * | 10/2016 | Boivin | E05C 9/046 |
| 2016/0332650 | A1 * | 11/2016 | Davison, Jr. | B62B 3/002 |
| 2016/0332651 | A1 * | 11/2016 | Benning | B62B 3/005 |
| 2016/0370082 | A1 * | 12/2016 | Olivo | F25D 3/06 |
| 2017/0297597 | A1 * | 10/2017 | Chen | B62B 3/005 |

* cited by examiner

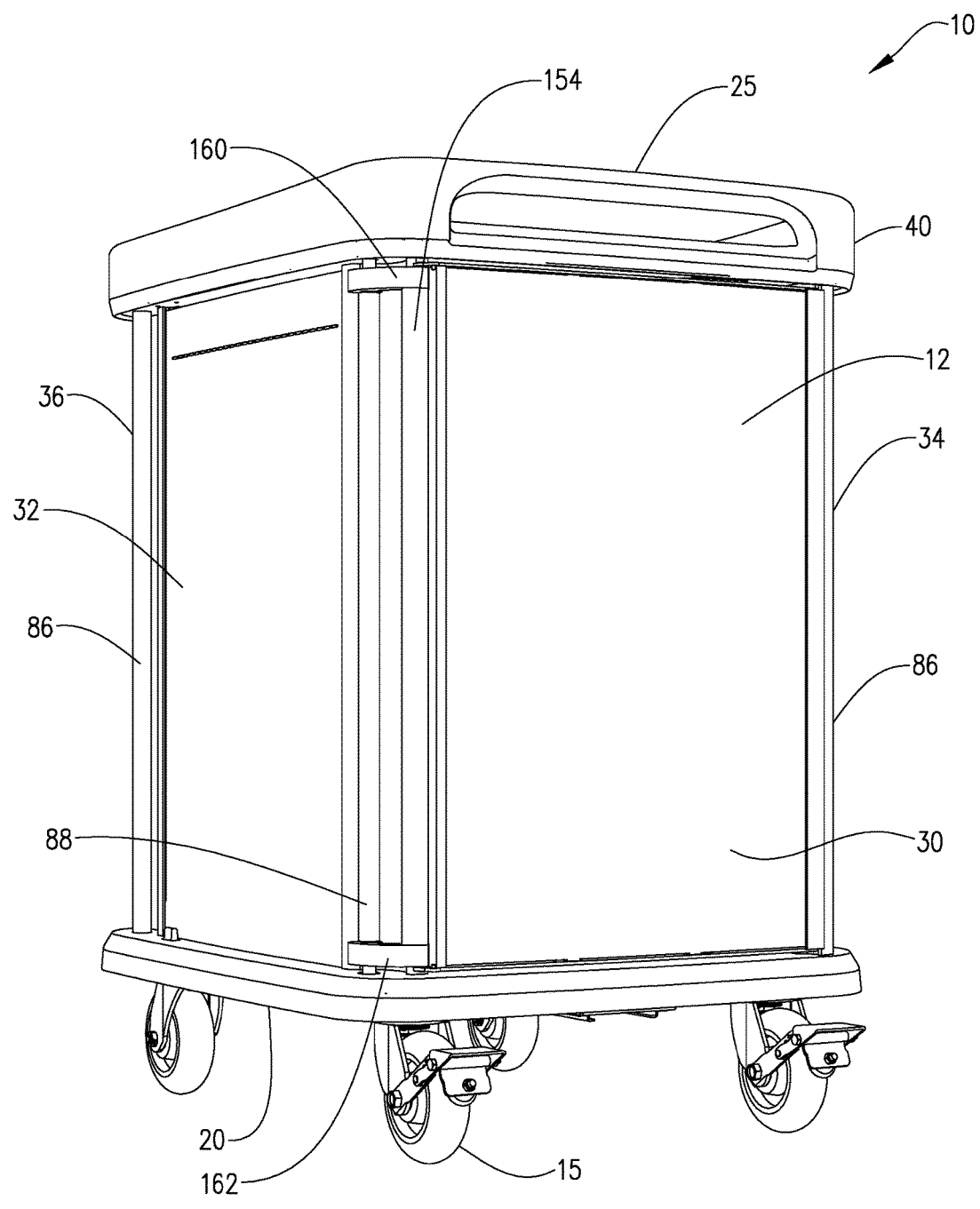
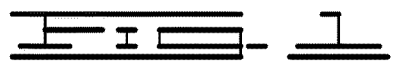

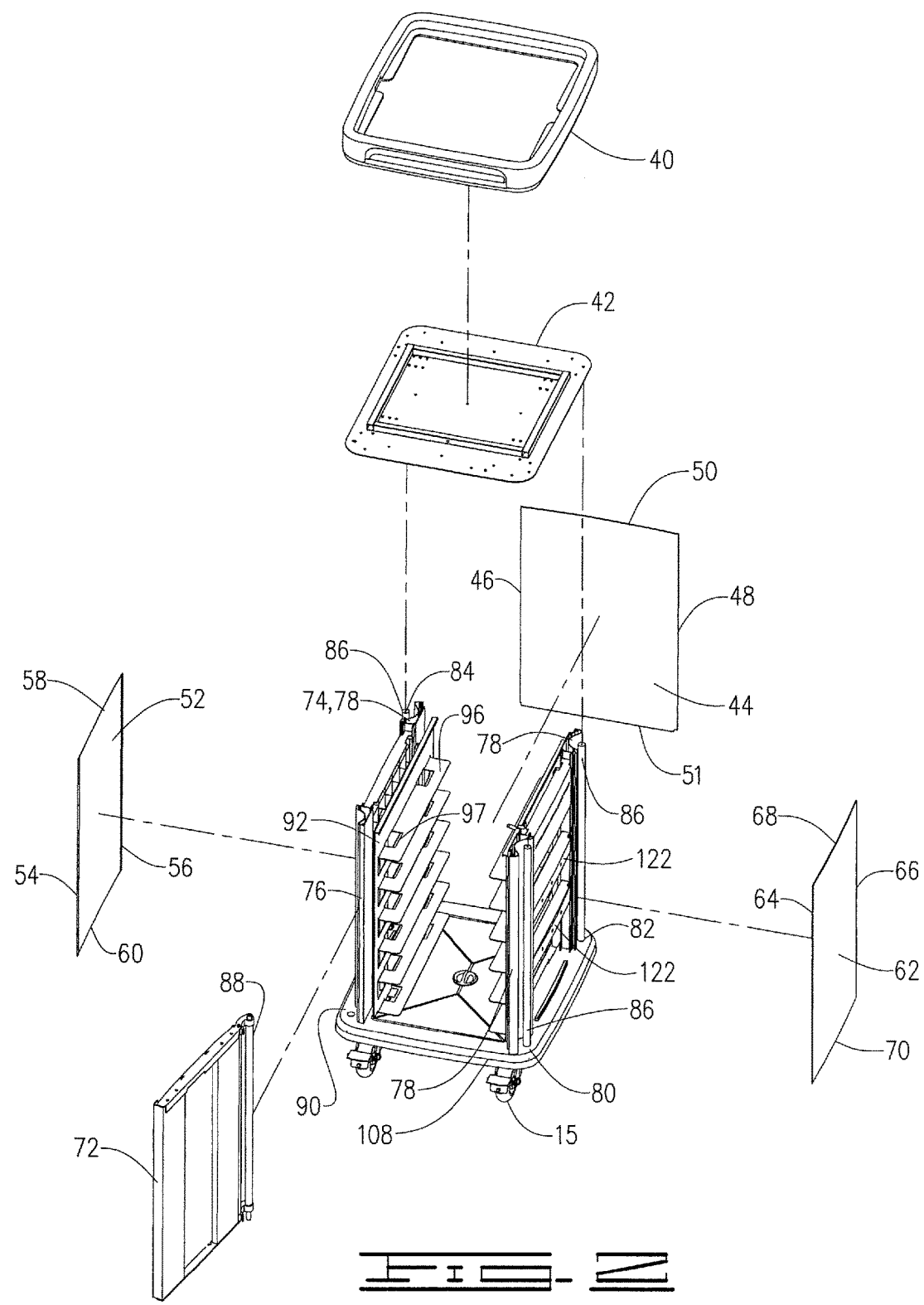

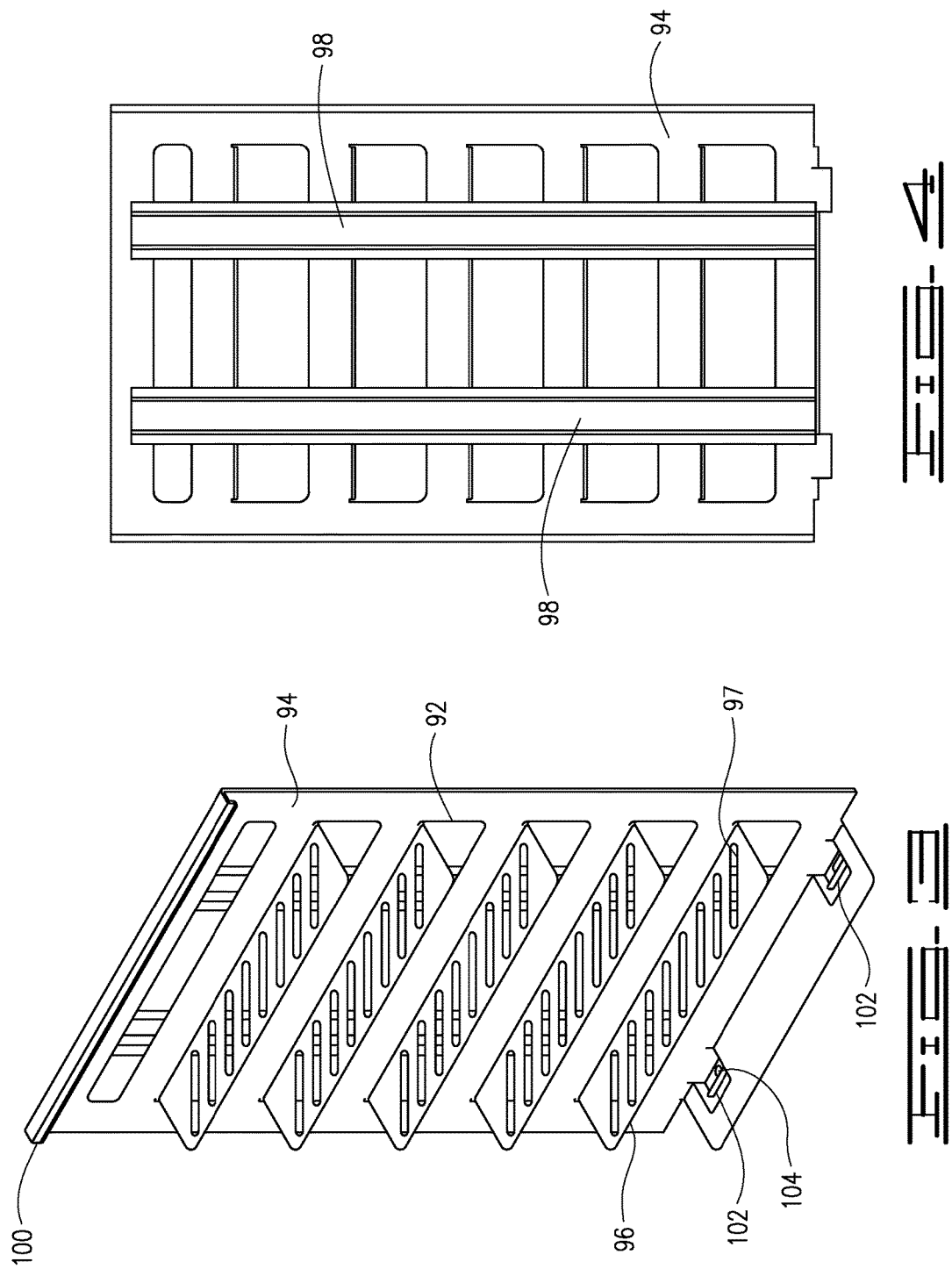

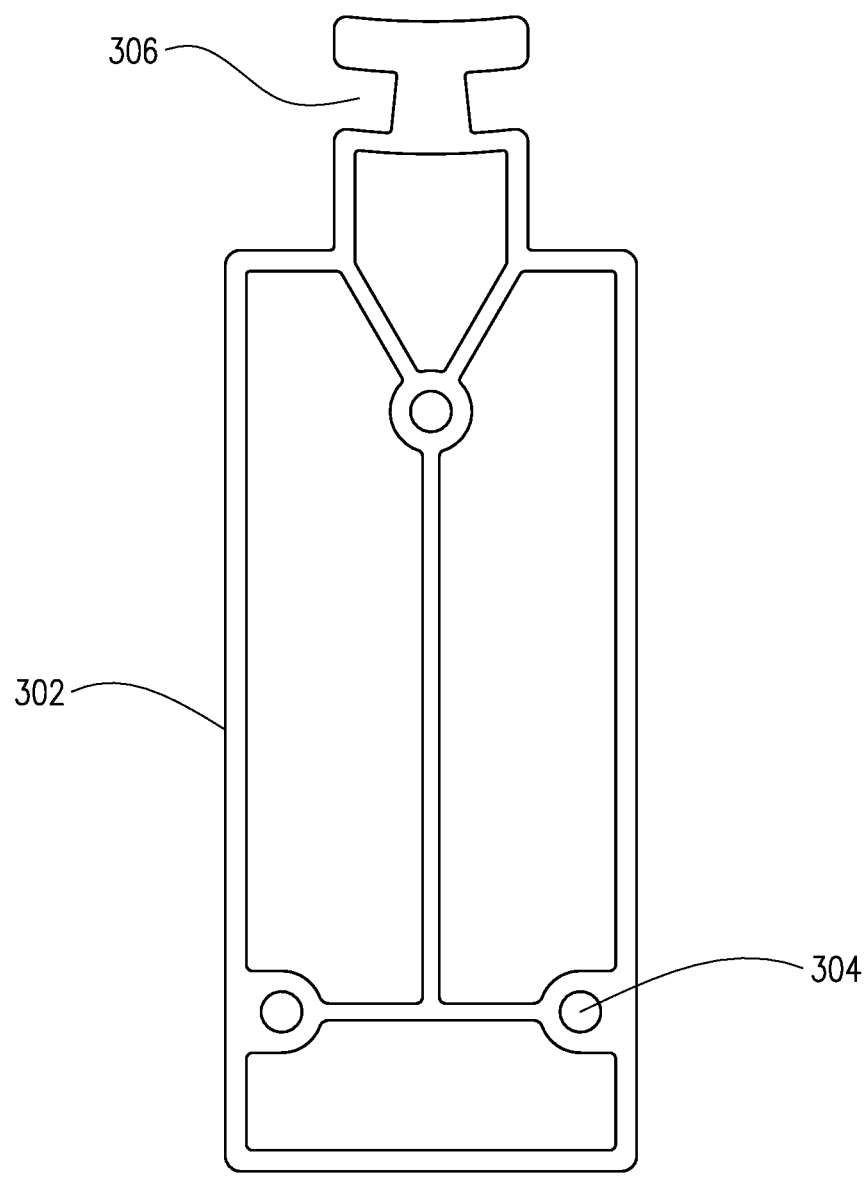

MODULAR CART

BACKGROUND

Utility carts are used in a wide range of business and industries. Most carts are configured for a single application and are not designed for multiple uses, or for easy replacement of parts that are damaged, worn or simply aesthetically marred. Similarly, most carts are not reconfigurable. Most carts consist of components that are welded, riveted, or otherwise permanently joined to one another. As a result, cart users must either make costly and time consuming modifications to their existing carts or purchase entirely new carts for each particular application and replace carts which may still be usable but have parts that are worn, scratched or unsightly. When multiple applications are required at a single location an entire fleet of carts may be required to fill specific purposes. As a result, users may require a large number of carts, each useful for only a particular, narrow application.

The same problem exists in many industries. For example, in the medical industry, different wards, units or floors of a hospital may each use multiple, specialized cart configurations and such carts are often roughly handled which causes damage. However, the carts used in the medical industry usually have a fixed configuration. Similar problems exist in the food service, hotel and other industries.

SPECIFICATIONS

FIG. 1 is a perspective view of a completed food tray cart.

FIG. 2 is an exploded view of an embodiment of the cart of FIG. 1.

FIG. 3 is a perspective view of a shelf panel.

FIG. 4 is a rear view of a shelf panel.

FIG. 9A is an enlarged view of the edge of a panel.

FIG. 20 is a view of a center post that may be used with a configuration as shown in FIGS. 18 and 19.

SUMMARY

Figure 5:
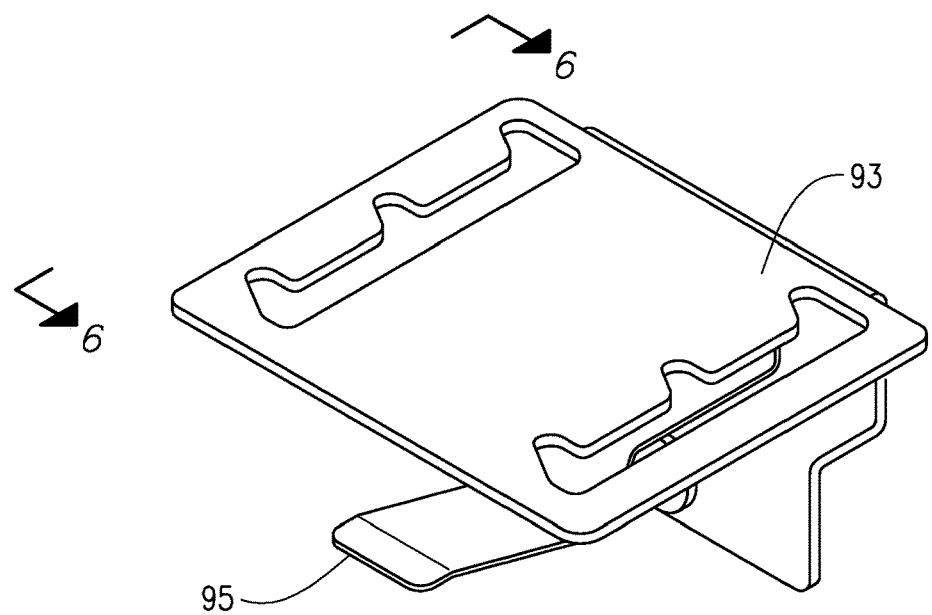
FIG. 5 is a perspective view of a retaining clip for retaining the shelf panel in the cart.
Figure 6:
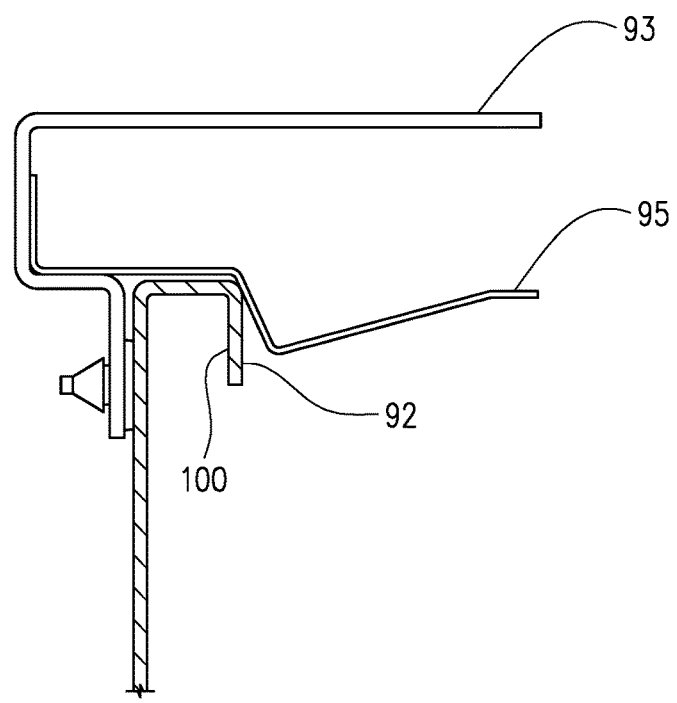
FIG. 6 is a side view and partial cross section of a retaining clip and the shelf panel.
Figure 7:
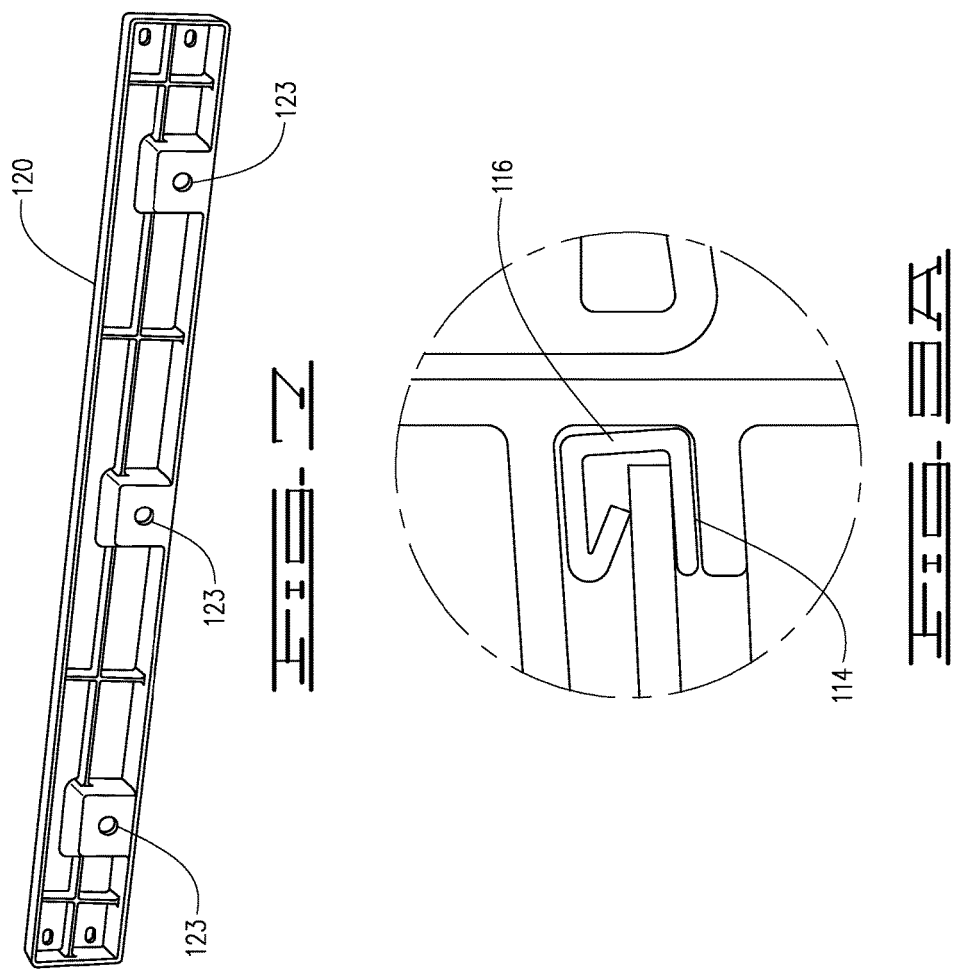
FIG. 7 is a perspective view of a cross brace detail.

The current disclosure is directed to a wheeled food tray cart. The wheeled food tray cart is generally constructed with bolts or other threaded fasteners such that it is easily constructed and deconstructed. The food tray cart provides for the efficient replacement of damaged, scratched or other marred or unsightly parts and likewise provides for a kit of parts that can be utilized to easily construct the food tray cart. A kit for constructing the food tray cart includes rear panels, left and right panels and a door assembly. Also included are a plurality of corner posts which define channels for removably receiving the left side, right side and rear panels. The corner posts are removably connectable to a base and a top plate. A plurality of corner rods may be also connected to the top plate and the base and may be utilized as handles to move the food tray cart. The corner posts and rods are connected to the top and the bottom with removable fasteners such as bolts or other threaded fasteners. The rear and side panels are slidable in and out of the corner posts and may be easily removed and replaced. The left and right side panels are preferably identical.

A shelf panel for the wheeled cart comprises a back plate with a plurality of shelves extending therefrom. The kit will include a plurality of shelf panels. The shelf panels are held in place by spring clips and can be easily removed from and installed in the cart. Different configurations of top caps are usable with the cart and may be included in the kits. The top cap is connected with threaded fasteners to the top plate. Carts of different widths and heights may be constructed for use using parts that are interchangeable. For example, carts with the same depth and width but differing heights can use identical tops and bottoms. Carts of differing depths and widths but the identical height can use identical corner posts and rods. Thus kits with different sized and interchangeable components can be used to construct a variety of differently shaped and configured carts.

DESCRIPTION OF AN EMBODIMENT

Referring to the figures, and particularly FIG. 1, a wheeled cart 10 of the current disclosure is shown in FIG. 1. Wheeled cart 10 comprises a cart body 12 mounted to a plurality of wheels 15. Wheeled cart 10 has a bottom 20, a top 25, a front or forward side 30, a left side 32, a right side 34 and a back or rear side 36, and an interior 37.

Top 25 comprises a top cap 40 and a top plate 42 which is shown in FIG. 2. Top plate 42 may be connected to top cap 40 with removable fasteners, such as threaded bolts so that top cap 40 is easily removable and replaceable. Top cap 40 may thus be provided with different configurations on the upper surface thereof and may be configured to include different sized and shaped compartments to carry condiments, flatware, cups and other food service equipment. Built-in docking stations, timers and ID tags can also be included on the top cap 40.

Cart 10 includes a rear panel 44 with left, right, top and bottom edges 46, 48, 50 and 51 respectively. A left side panel has a forward edge 54, a rear edge 56, top edge 58 and bottom edge 60. Right side panel 62 has forward edge 64, rear edge 66, top edge 68 and bottom edge 70. Left and right panels 52 and 62 are interchangeable. Left and right side panels 52 and 62 along with the rear panel 44 are removable and replaceable, so that damaged panels can be easily replaced. Cart 10 has a door assembly 72 that is easily removable and replaceable.

Cart 10 includes a plurality of corner posts 74, which include a door corner post 76 and three identical corner posts 78 positioned at the other corners. Thus, corner posts 78 are positioned at the front right, rear right and rear left corners 80, 82 and 84 respectively. Door corner post 76 acts as a hinge for the door assembly 72. A plurality of corner rods 86 are positioned at corners 80, 82 and 84 and a door rod, or hinge rod 88 is positioned at the left forward corner 90. Rods and posts 86, 88 and 74 are connected to top plate 42, which as described is connected to top cap 40 with bolts or other removable fasteners. As a result, disassembly of the cart 10 and replacement of parts is simple and efficient.

Cart 10 has a pair of shelf racks or shelf panels 92 removably installed in the interior 37 of cart 10. Shelf racks 92 include a back plate 94 and a plurality of shelves 96 extending outwardly therefrom. In the embodiment shown, shelves 96 extend from back plate 94 at right angles. Support braces, which may be vertical support braces 98, are welded or otherwise fixed to back plate 94. An inverted U-shaped channel 100 is positioned at the top of shelf panels 92 which are held in place by spring clips 93. Spring clips 93 are attached with threaded fasteners to top plate 42, and have a spring arm 95 that will hold the upper end of shelf panel 92 in place with a biasing force directed toward the shelf panel. Shelf panels 92 may have feet 102 at a lower end thereof which may have openings or holes 104. Shelf feet 102 will fit over support pads in the bottom of the cart 10.

Figure 9:
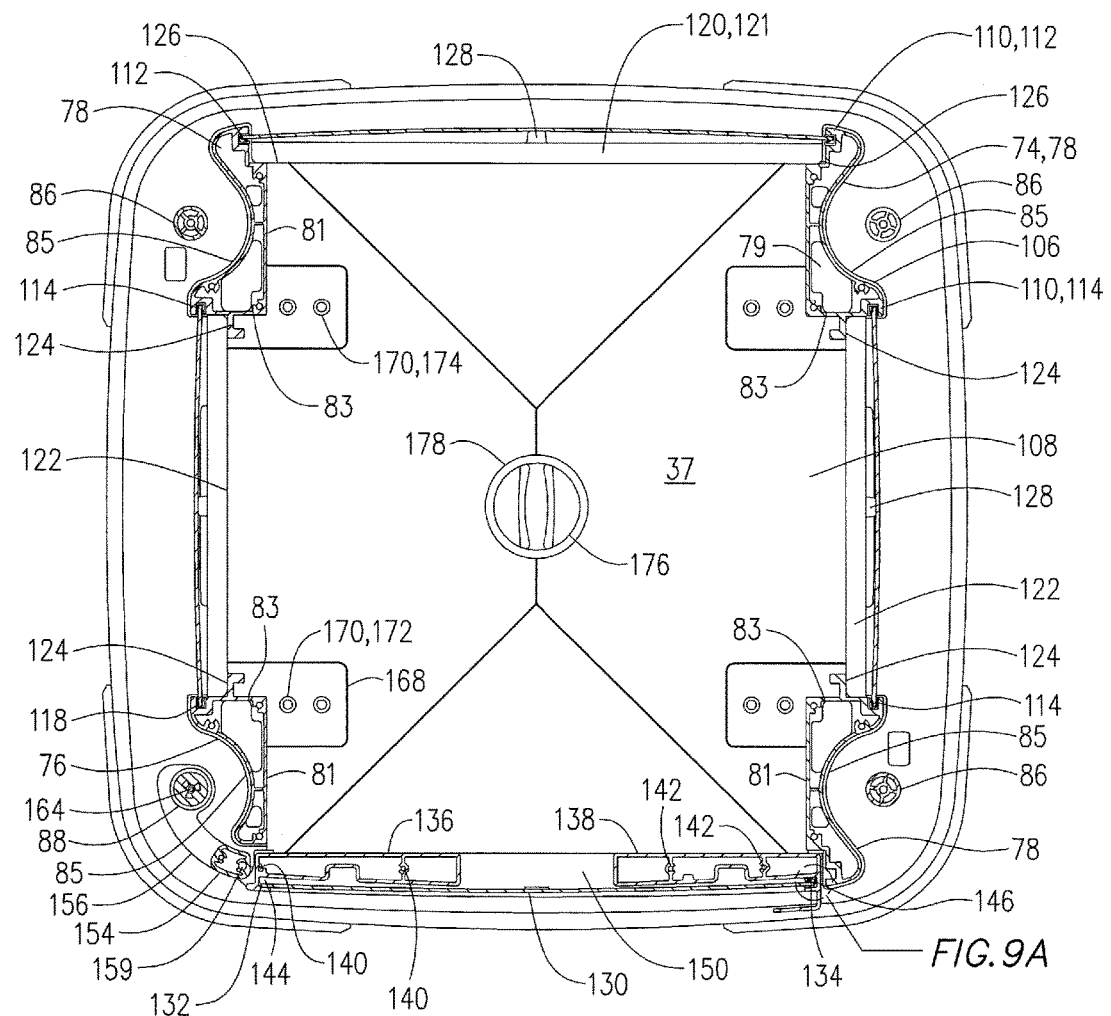
FIG. 9 is a cross section looking down at the bottom of the cart.
Figure 10:
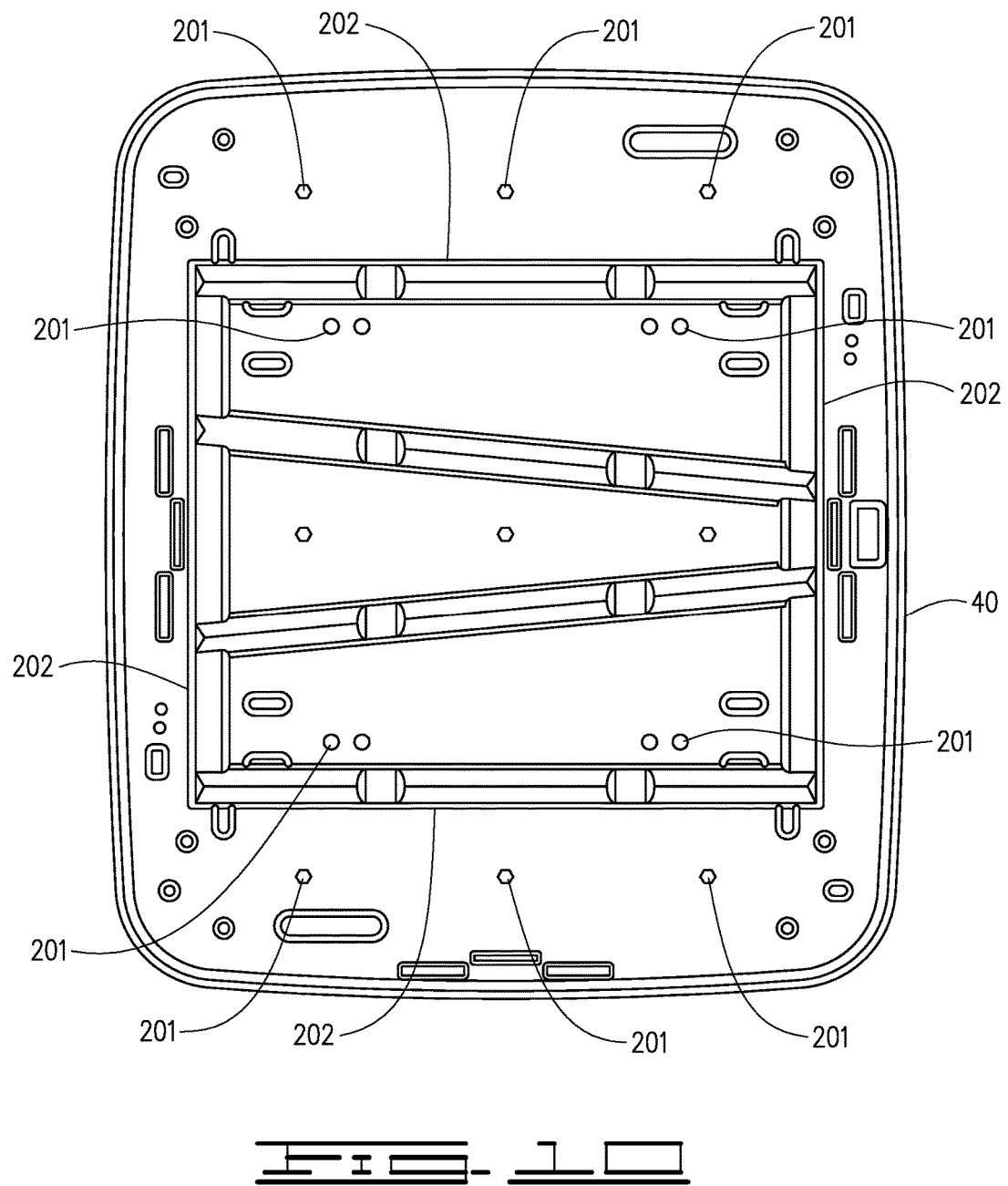
FIG. 10 is a view looking at the bottom of a top cover.

Shelf panels 92 have openings 97 in the shelves 96 thereof, which may be simply rectangular openings as shown in the exploded view in FIG. 2, angled slots as shown in the detailed version of FIG. 3 or other differently shaped openings. Referring now to FIG. 9, a cross section looking down at the bottom of the cart 10 is shown. As shown therein, corner posts 76 and 78 are irregularly shaped and define an enclosure 79 bounded by a first side 81, a second side 83, and an arcuate side 85. Arcuate side 85 is configured to provide clearance for corner rods 86. Corner posts 76 and 78 have a plurality of openings and preferably three openings 106, which will receive bolts or other fasteners threaded through top plate 42. As a result, top plate 42 is easily connectable and removable, as are corner posts 76 and 78. Bottom 20 of the cart includes a base 108 with a bottom plate 210 connected thereto. Corner posts 76 and 78 will rest upon base 108 and will be connected with threaded fasteners to the bottom 20.

Corner posts 78 further include U-shaped channels 110. U-shaped channels 110 comprise first and second U-shaped channels 112 and 114 at the periphery thereof. U-shaped channel 112 generally faces directionally approximately 90 degrees from U-shaped channel 114. As is apparent from the drawings, the left and right side panels 52 and 62, along with rear panel 44, are received in U-shaped channels 112 and 114. As depicted in FIG. 9A, a protective clip 116 may be utilized around the edge of the left, right and rear panels to protect from damage and to hold the panels in place. Post 76 likewise defines a U-shaped channel which may be identified as U-shaped channel 118 for receiving forward edge 54 of left side panel 52. Post 76 likewise has openings or holes 106 so that post 76 may be connected with threaded fasteners to the top and bottom 25 and 20. Fasteners will connect posts 76 and 78 through base 108 and bottom plate 110, and will connect posts 76 and 78 to top plate 42 which is in turn connected to top cap 40.

Cart 10 includes cross braces 120, which may comprise horizontal rear braces 121 and side cross braces 122. Rear and side cross braces 121 and 122 are mounted to corner posts 74 with threaded fasteners through connection surfaces 124 defined on the support posts 74. There may be a plurality of cross braces 121 and 122 vertically spaced apart from the top to the bottom of the panels and may include, for example, three or more as shown in FIG. 2. A rubber bumper 128 may extend from each of rear and side cross braces 120 and 122. The rubber bumper 128 will engage rear, left and right side panels 44, 52 and 62 to prevent rattling and/or unnecessary noise and to prevent movement of the panels. While FIG. 9 only shows one bumper 128, it is understood that a plurality of rubber bumpers or dampers may be utilized and may be inserted in openings 123 in cross braces 120.

Figure 8:
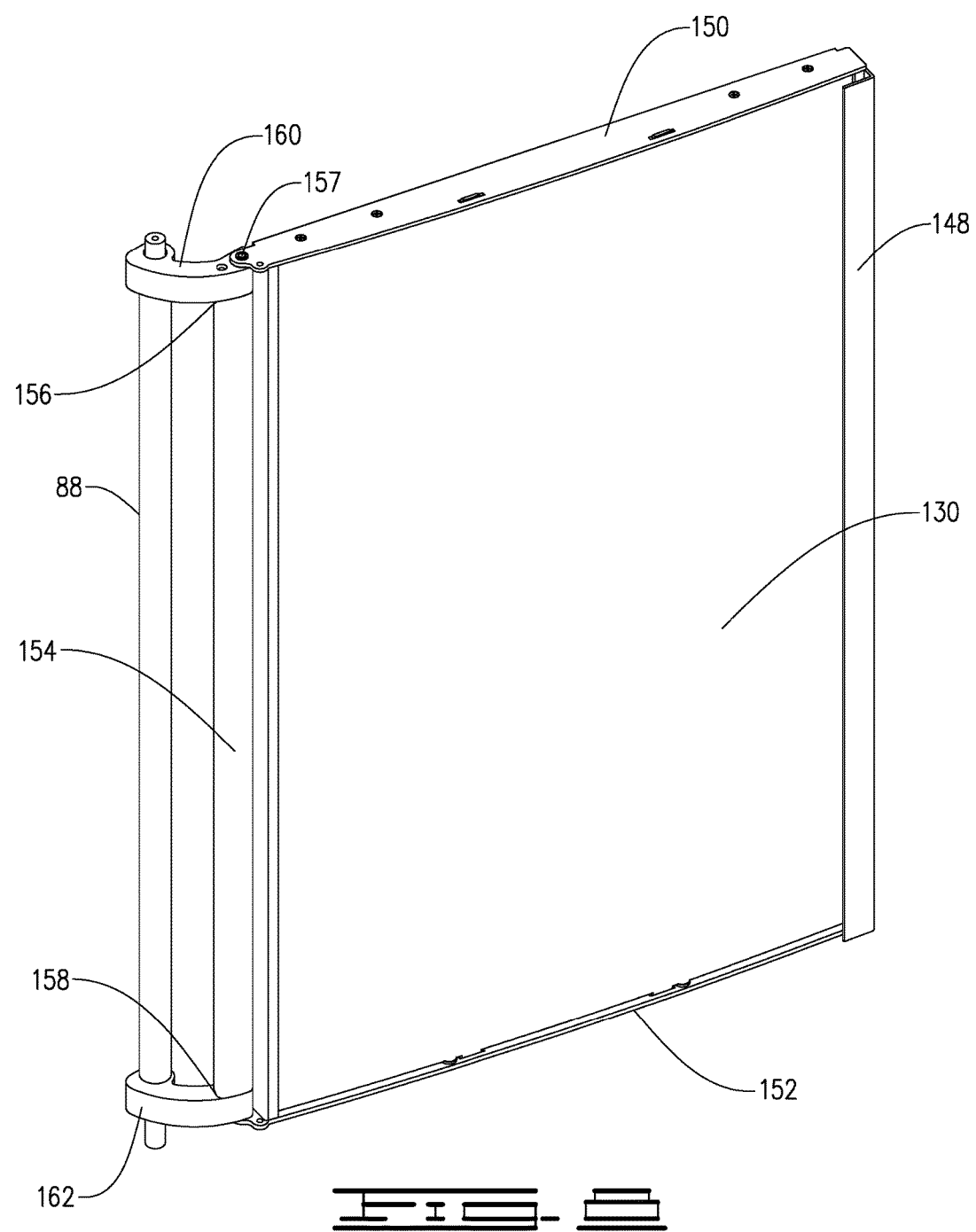
FIG. 8 is a perspective view of a door assembly.

Referring now to FIGS. 8 and 9, door assembly 72 includes a door panel 130 with left and right edges 132 and 134 respectively. Door assembly 72 has a first door beam or door frame 136 and second door beam or door frame 138, each of which extend along the height of the door. First door frame 136 has openings 140 at the top and bottom thereof and second door beam 138 has openings 142 at the top and bottom thereof. First door beam 136 defines a U-shaped channel 144 and second door beam 138 defines U-shaped channel 146, both of which extend along the height of the first and second door beams 136 and 138. Door panel 130 is slidably received in channels 144 and 146. A top cap 150 and bottom cap 152 are connected with threaded fasteners to the first and second door beams 136 and 138. Door panel 130 is thus easily removed and replaced by simply removing top door cap 150 by removing threaded fasteners, and sliding out a door panel 130 to replace with a new door panel 130.

Door assembly 72 further comprises a hinge post 154 with upper and lower ends 156 and 158 respectively. Hinge post 154 is connected at its upper end to a hinge arm, which may be referred to as an upper hinge arm 160 and its lower end 158 to a bottom or lower hinge arm 162. Hinge post 154 is connected with fasteners at the top 156 and bottom 158 thereof. One of the fasteners identified as fastener 157 acts as a hinge pin. Hinge pin 157 is connected to door rod 154 at the top 156 and bottom 158 through top and bottom caps 150 and 152, at openings 159. Door rod or hinge rod 88 is received in openings through both of the upper and lower hinge rods 160 and 162 respectively. Door assembly 72 will rotate about rod 88 and is capable of a 270 degree rotation from fully closed to fully open where the door panel 130 is adjacent left side 32. 270° rotation is provided as a result of the additional rotation provided by hinge pin 157. An opening 164 at the top and bottom of rod 88 is utilized to connect door rod or hinge rod 88 to top plate 42 and bottom 20 through base 108 and bottom plate 210.

FIG. 9 shows raised pads 168 on base 108 will dampen any vibration of shelf panels 92 and will help to hold the shelf panels 92 in place. In addition, raised bumpers or shelf posts 170 may be received in openings 104 in shelf panels 92. Shelf posts 170 comprise first shelf post 172 and second shelf post 174. The posts are utilized for different sizes of shelf panels 92. Base 108 may have a drain hole 176 with a plug 178 therein, to allow for cleaning and draining of liquid.

Figure 11:
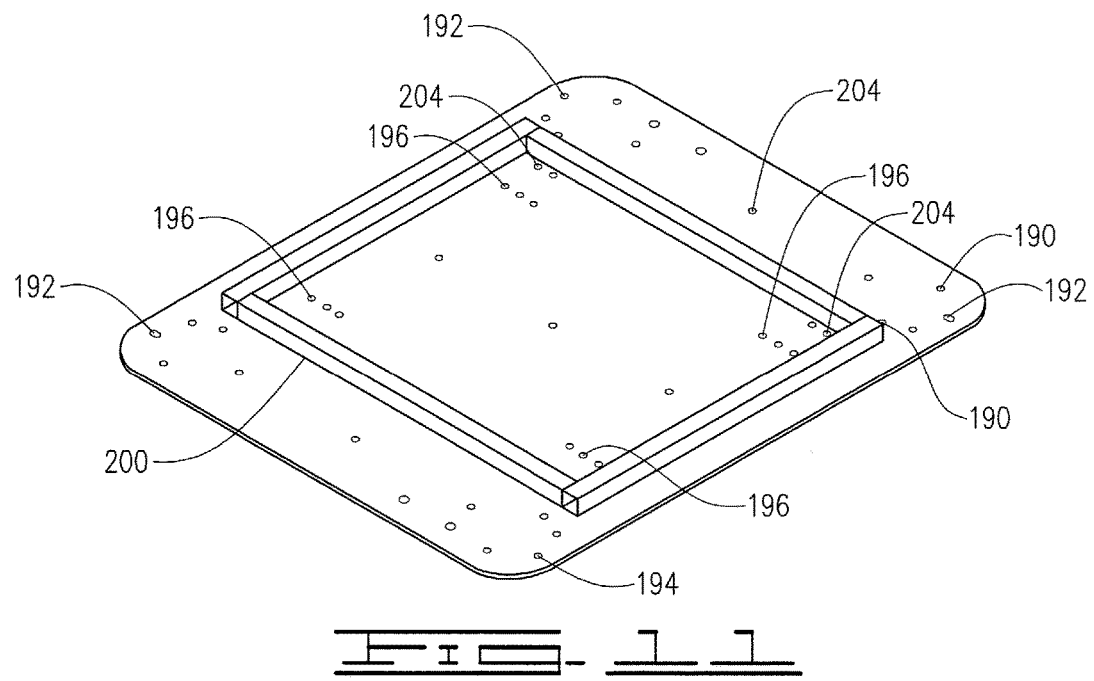
FIG. 11 is a perspective view of a top plate.
Figure 12:
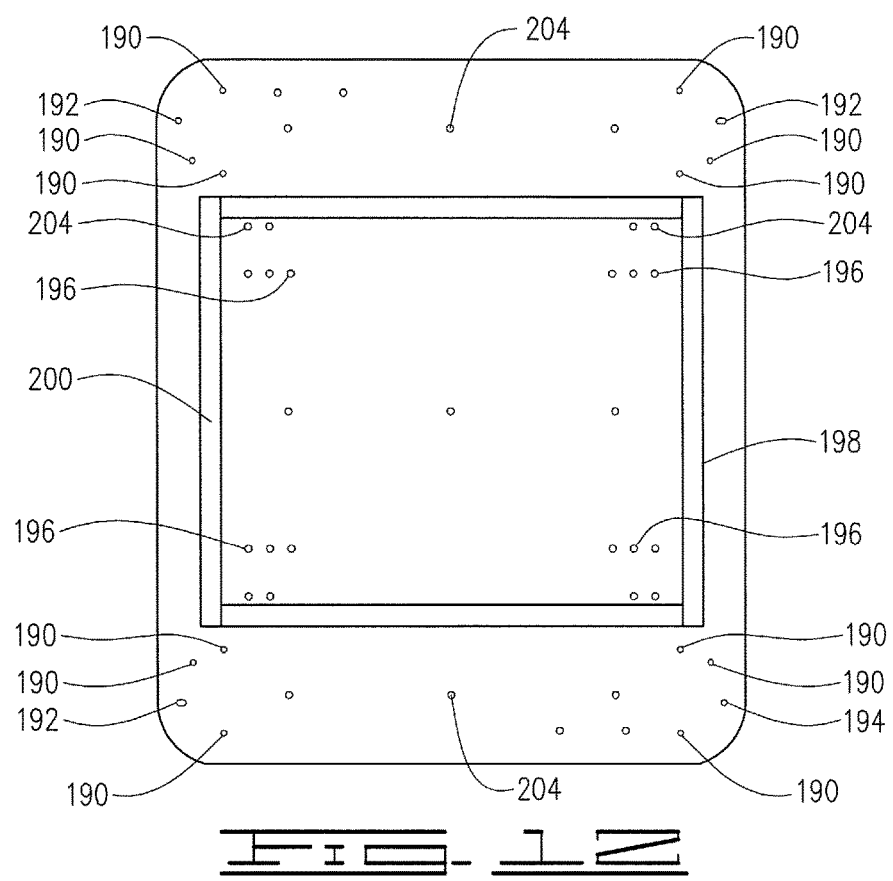
FIG. 12 is a top view of a top plate.

Referring now to FIGS. 11 and 12, top plate 42 comprises a plurality of openings 190 at each corner thereof. Specifically, there are three openings 190 at each corner thereof to be utilized for connecting each of the corner posts 74 to the top plate 42. In addition, three of the corners, namely the left and right rear, and the right rear corner have openings 192 to connect to each of corner rods 86. The left forward corner has an opening 194 to connect to hinge rod 88.

A plurality of holes 196 may be utilized to attach spring clips 93 to top plate 42. Spring clips 93 hold the upper end of shelf panel 92 in place, so that the shelf panels 92 are upright and can be easily removed. Top plate 42 may include a structural assembly 198 comprised of a plurality of channels or square rod 200. Referring now to FIG. 11, top cap 40 will have grooves 202 therein to receive structural assembly 198. Bolts or other threaded fasteners may be inserted through openings 204 of top cap 42 into mating openings 201 that may have threaded inserts therein in the bottom side plate 40 to attach top cap 42 thereto.

Figure 13:
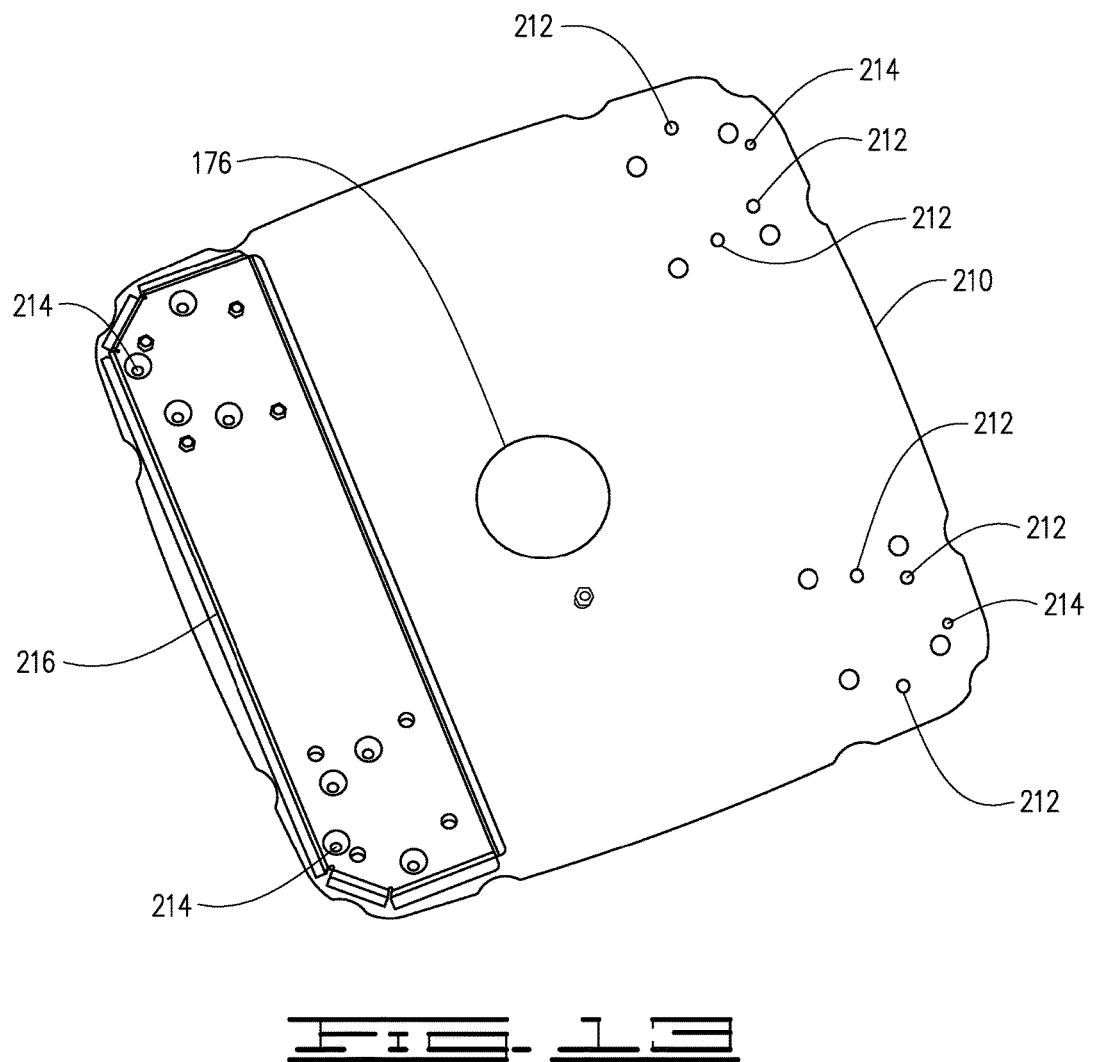
FIG. 13 is a bottom view of a bottom plate with one caster plate connected thereto.
Figure 14:
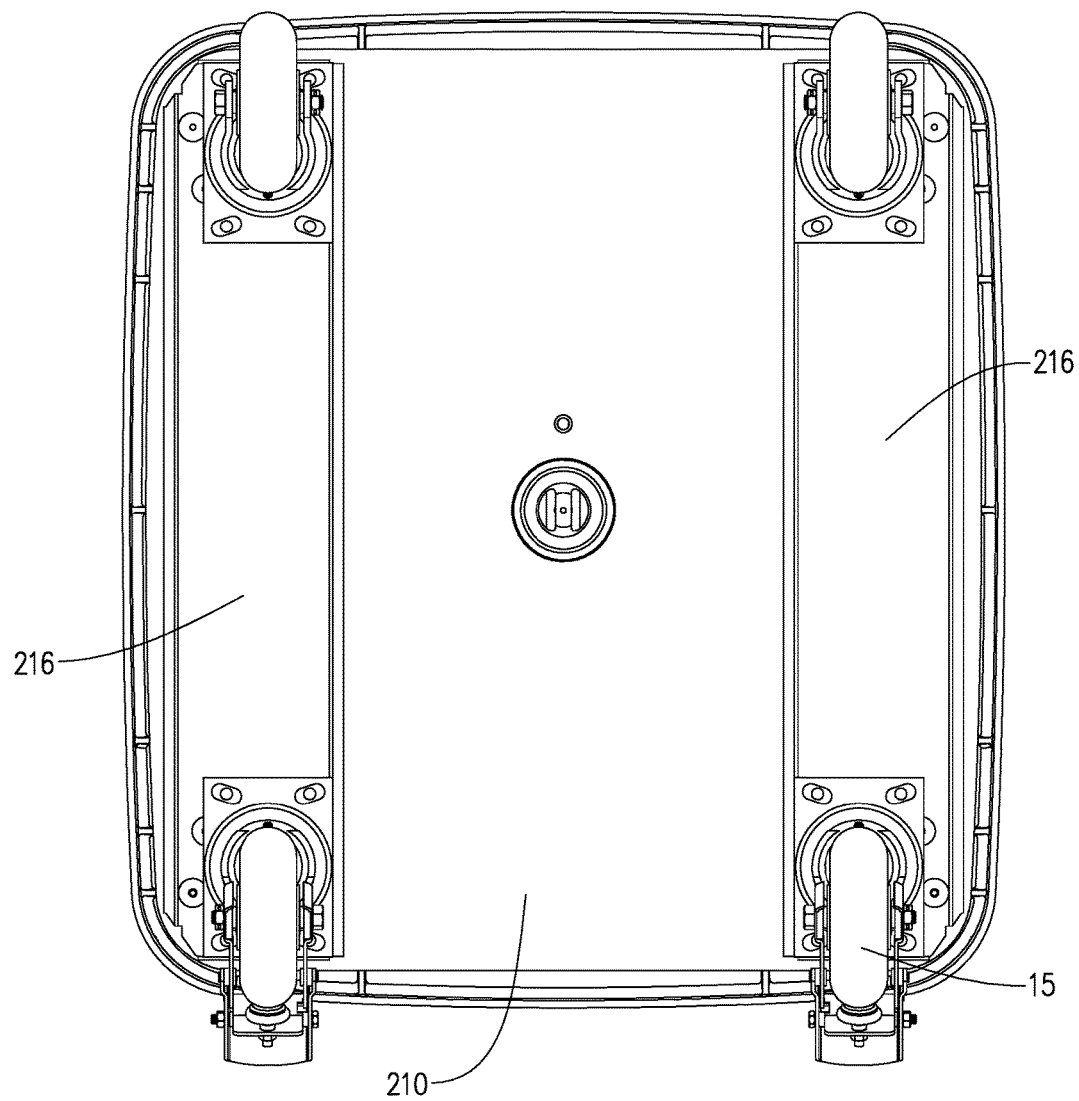
FIG. 14 is a bottom view of the bottom of the cart.

The assembly of the bottom of cart 10 is similar. As depicted in FIGS. 13 and 14 a bottom plate, which may be a metal bottom plate 210, has openings 212 to allow threaded fasteners to be inserted therethrough and through base 108 to connect to each of corner posts 74. Openings 214 are utilized to connect to each of the corner rods, including the door corner rod, with threaded fasteners. Castor brackets 216 are connected to plate 210 so that wheels 15 may be attached thereto utilizing bolts or other threaded features. Only one castor bracket is shown in FIG. 13, but it is understood, and as shown in FIG. 14, cart 10 has two castor brackets 216. While the cart 10 is shown with a single door assembly 72, the cart may be constructed as a pass through cart. In such a configuration, the rear panel is replaced by a door assembly 72, and the rod and post configuration is at the right rear corner and is identical to the configuration shown in the embodiment described at the left front corner.

The cart 10 of the current disclosure is thus a cart that is comprised of easily replaceable parts. A kit for constructing a wheeled cart 10 may therefore include a plurality of wheels 15, a plurality of top caps 40, top plates 42 and rear, left and right side panels 44, 52 and 62 respectively. Left and right side panels 52 and 62 are interchangeable. The kit may further include a plurality of corner posts 74, which may comprise door corner posts 76 and corner posts 78 that can be utilized at all corners other than a door corner. Likewise, a plurality of corner rods 86 and door rods or hinge rod 88 may be included. Any number of posts, rods and other components may be utilized in a kit.

A plurality of shelf panels 92, spring clips 93 and cross braces 121 and 122 with rubber bumpers 128 therein may form a portion of the kit as may the base 108 and bottom plate 210. Door assembly 72 may be included assembled in the kit or in component parts. All of the parts, fasteners and connections for a cart 10 may be included in the kit, so that the cart is easily assembled. Likewise, because the cart 10 is assembled with threaded fasteners and interchangeable parts, any damaged parts, scratched or otherwise aesthetically impacted parts can be easily removed and replaced. For example, damaged or scratched rear, left and right panel 44, 52 and 62 can be removed and replaced by disconnecting top cap 40 from top plate 42 simply by unthreading fasteners. Top cap 40 can then be removed, and the panels removed from channels 110 and replaced with new panels. Alternatively, the top plate can have a configuration like that shown in FIG. 16, in which case the left, right and rear panels can be removed and replaced simply by removing the top cap 40. By providing independent or disassembled parts in a kit, carts may be assembled and/or utilized in varying configurations. Likewise, the door assembly may easily be replaced with an identical door assembly 72. In this way, clean and new looking carts may always be utilized.

Figure 16:
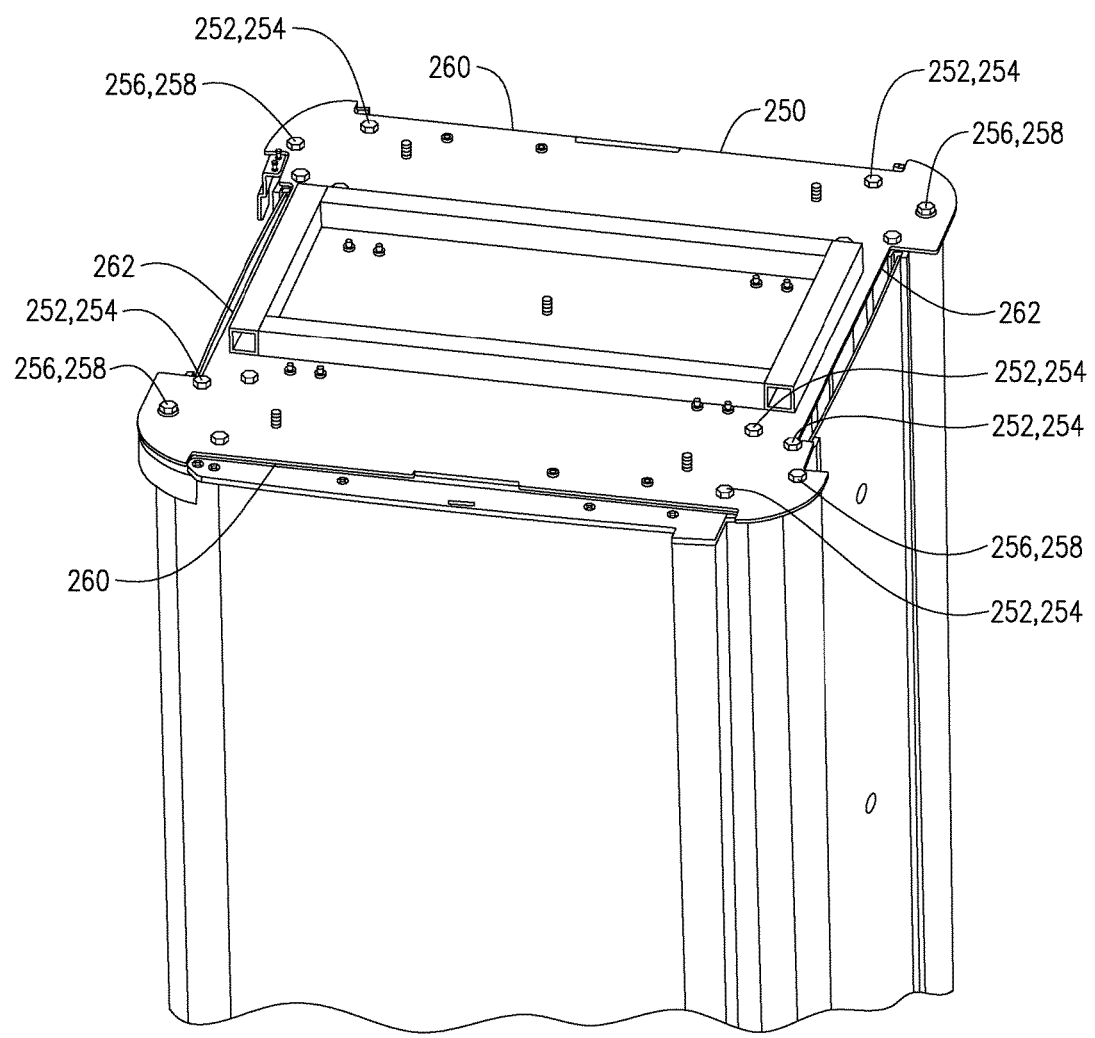
FIG. 16 is a view of the cart of FIG. 15 with a top plate connected thereto.

There are a number of configurations of carts that may be constructed and utilized. For example, FIG. 16 shows a top plate with cutouts at the edges thereof. Top plate 250 is configured to connect to a top cap thereto, and is configured to connect to door posts and door rods as described herein. Thus, top plate 250 has threaded fasteners 252 through openings 254 to connect to corner posts such as corner posts 74. The spacing of the openings 252 may be identical to the spacing of openings 190. Threaded fasteners 256 may be inserted through openings 258 in top plate 250 to attach corner rods including the door corner rod thereto. Cutouts 260 at the front and rear of the cart and cutouts 262 at the left and right sides provide clearance so that the rear panel and left and right panels may be removed and replaced without removing top plate 250.

Figure 15:
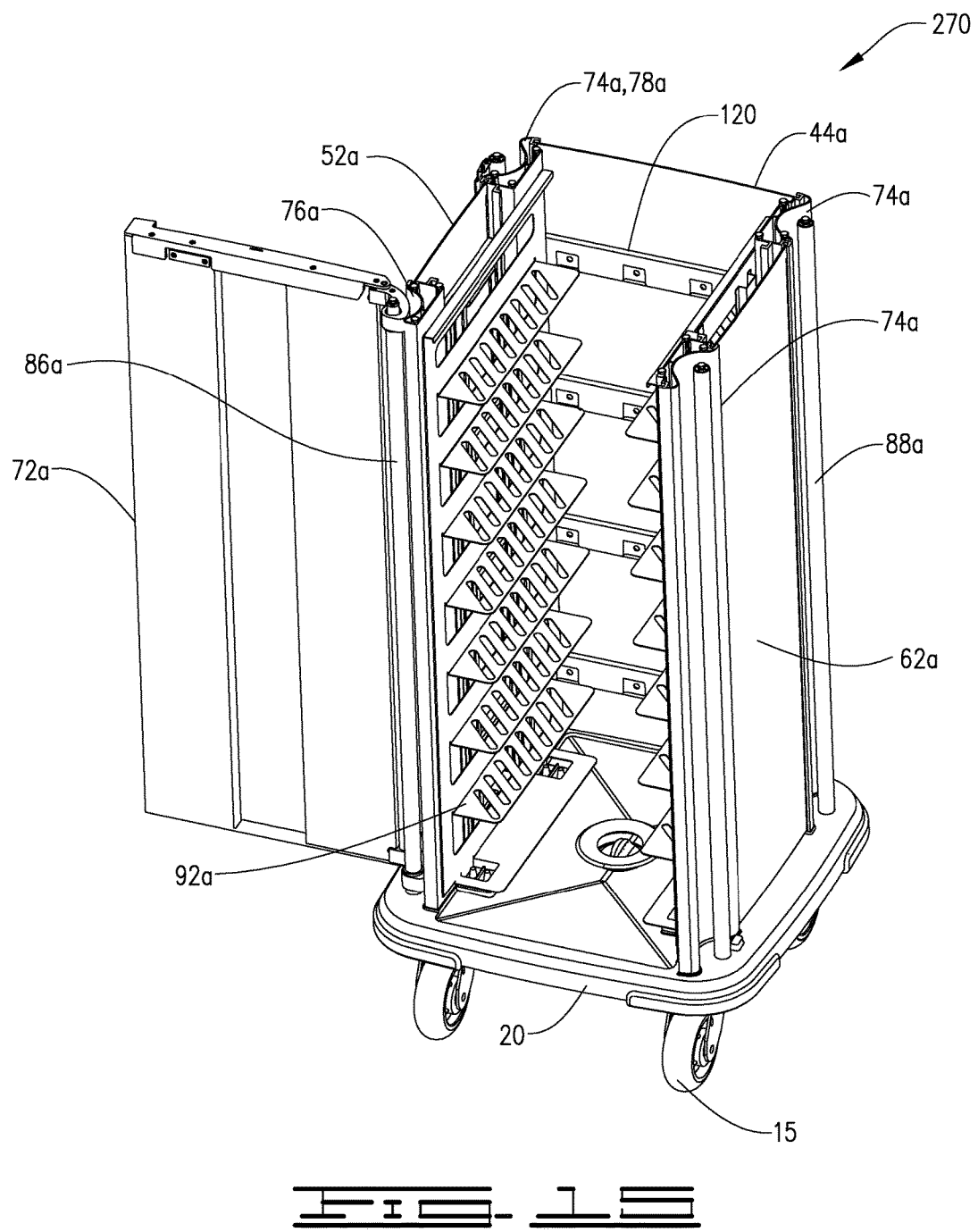
FIG. 15 is a perspective of an embodiment of a cart with no top plate connected thereto.

An embodiment of a cart 270 in FIG. 15 may utilize either configuration of top plate. The embodiment of FIG. 15 is taller than the embodiment of FIG. 1, and includes more shelves on the shelf panel. Other than the height, however, the components are similar to those described with reference to FIG. 1, so that parts such as top and bottom plates, top caps and bases may be used interchangeably. Components of the embodiment of FIG. 15 that are similar to those in FIG. 1 are identified with the same designating numbers as the subscript a. The width and depth can be as desired but may be like that shown in FIG. 1, so certain parts are interchangeable, for example, bottom 20 and top cap 40. Identical components are identified with the same numbers and no subscript.

Figure 17:
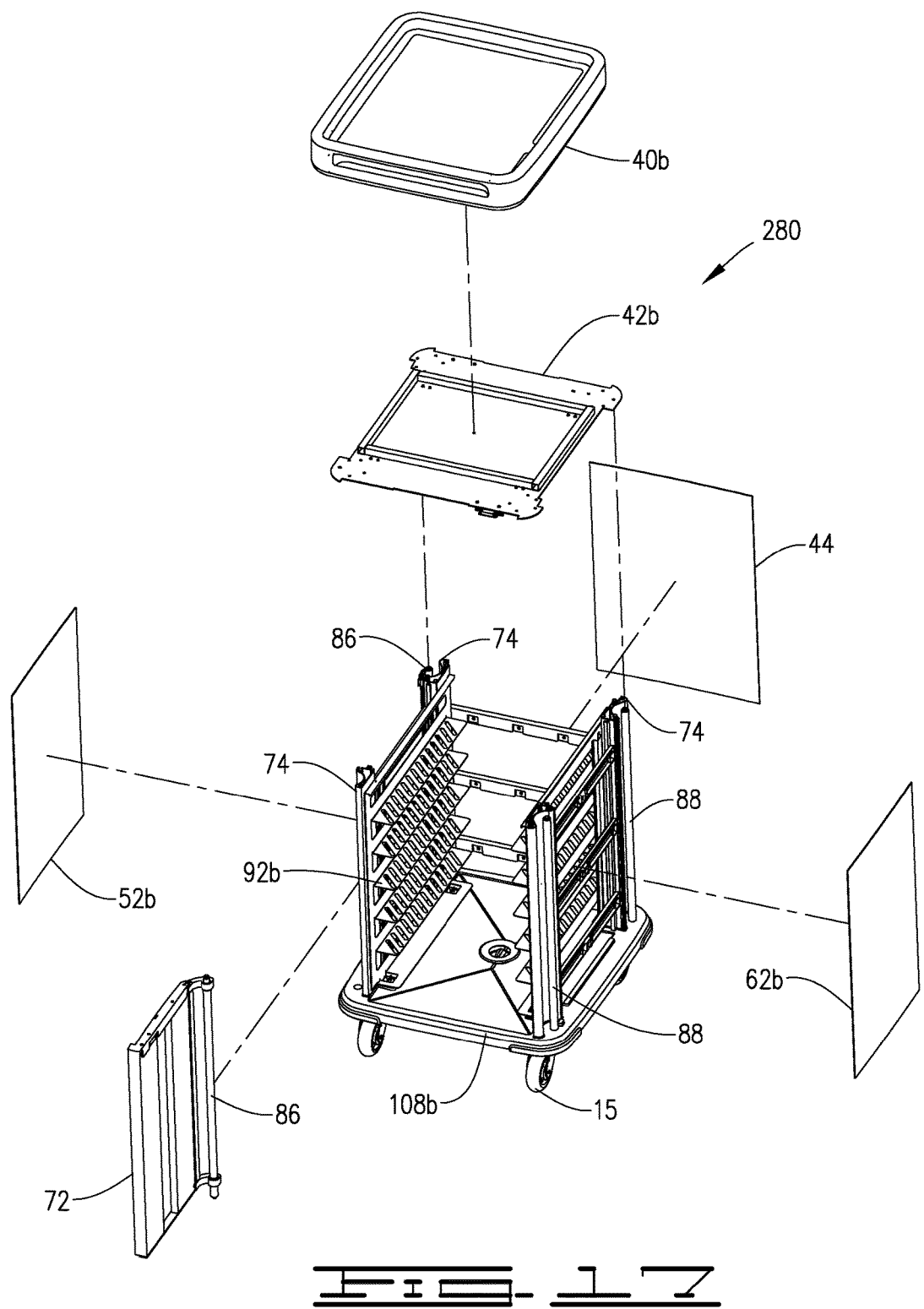
FIG. 17 is an exploded view of an additional embodiment of a cart.

In FIG. 17, a configuration is shown that has enough depth to utilize two standard sized food trays on each shelf. The overall assembly and construction is similar to that described herein and, as a result, similar features identified therein are simply identified with the letter b to show corresponding parts on the double tray configuration. Identical components are identified with the same numbers and no subscript. Cart 280 will hold two trays positioned side by side on each shelf panel 92b. Shelf panels 92b thus have more depth than shelf panels 92, but are otherwise similarly constructed. The corner posts 74 and rods 86 and 88 will have openings to receive threaded fasteners as described herein. The height can be identical to the embodiment of FIG. 1 or 15 or any desired height. In FIG. 17, because the height is identical to that of FIG. 1, certain parts, for example, posts 74, rods 86 and 88, may be identical to those shown in the embodiment of FIG. 1. Likewise the width may be the same, so that a rear panel 44 may be used. Thus, as described, a number of different heights, widths and configurations of carts can be constructed, and kits with different sizes of components may be used to construct such carts.

Figure 18:
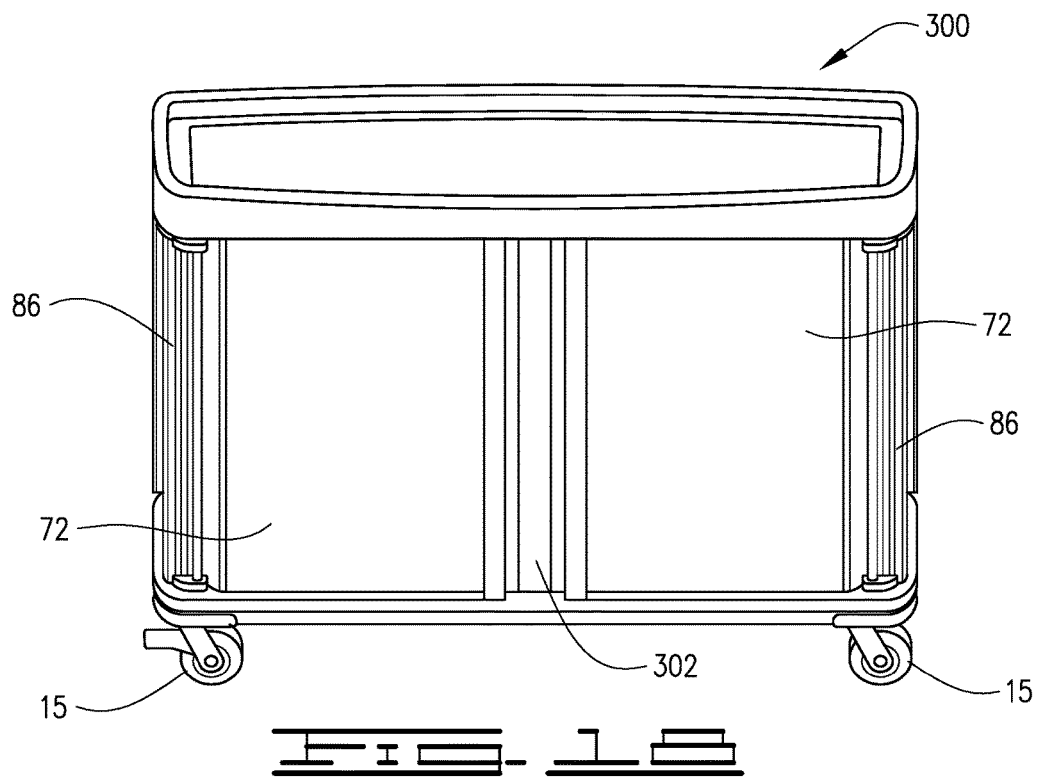
FIG. 18 is a front view of an additional embodiment of a cart.
Figure 19:
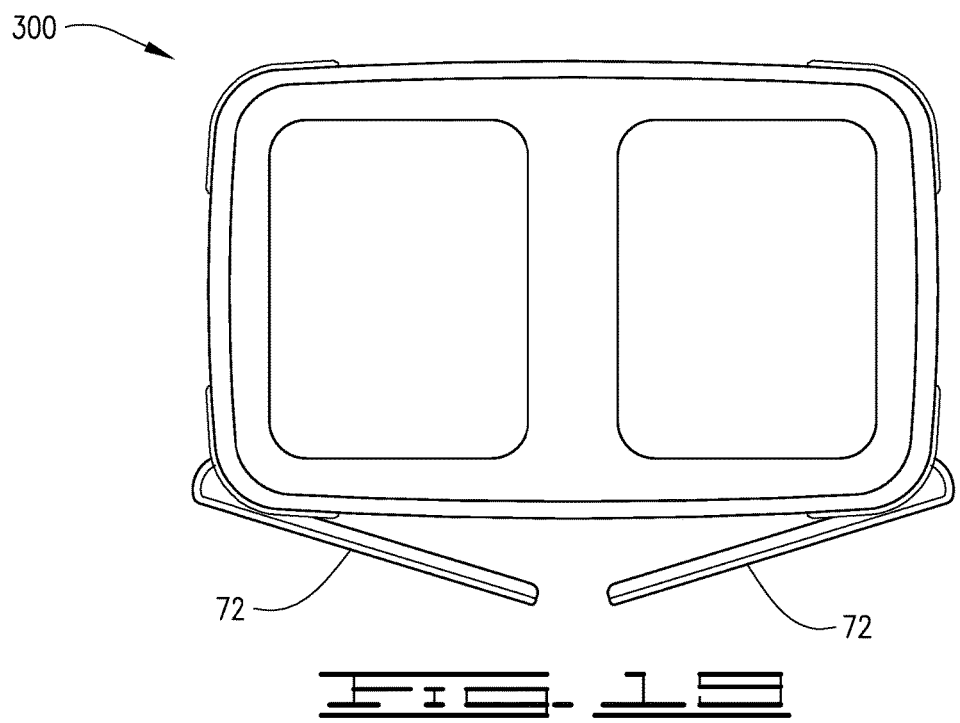
FIG. 19 is a top view of an additional embodiment of a cart.

If desired, a double bay configuration identified as a cart 300 may be constructed. Such a cart is depicted in FIGS. 18 and 19. In order to do so, a center post, for example, a center post 302 can be utilized. Center post 302 has openings 304 at upper and lower ends thereof, which will mate to the tops and bottoms of the cart assembly as described herein. Channels 306 will receive rear panels such as two rear panels 44. The top and bottom, and thus the base, bottom plate, top cap and top plate will be extended beyond what is shown, for example, in FIG. 1. The cart 300 will otherwise have openings and features similar to those described herein for connection to component parts. The panels and doors on a double bay may be identically sized, for example to those used in a single bay configuration like that shown in FIG. 1. In other words, the left and right side panels 52 and 62 may be utilized on cart 300 as can two door assemblies 72. In addition, the rear panels 44 likewise can be utilized since channels 306 are included for receipt thereof.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention.

What is claimed is:

1. A food tray cart comprising:
   a base;
   four corner posts removably connected to the base;
   a top plate removably connected to the four corner posts; and
   first and second interchangeable shelf panels configured to support a plurality of shelves, the first and second interchangeable shelf panels removably connected to an interior of the food tray cart by a retaining clip, and the first and second interchangeable shelf panels removeable without removal of any other components of the food tray cart.

2. The food tray cart of claim 1 further comprising left and right side panels slidably received in the corner posts, the left and right side panels being identically shaped and sized.

3. The food tray cart of claim 1, wherein the shelf panels comprise a back plate and a plurality of shelf portions extending at an angle therefrom.

4. The food tray cart of claim 1 further comprising:
   first and second interchangeable side panels slidably and removably received in the corner posts; and
   a rear panel slidably and removably received in the rear corner posts.

5. The food tray cart of claim 4, further comprising:
   a plurality of corner rods removably connected to the top and bottom; and
   a door hingedly connected to one of the corner rods.

6. The food tray cart of claim 4, further comprising a plurality of wheels removably connected to the base.

7. The food tray cart of claim 1 further comprising an upper cap removably connected to the top plate.

8. The food tray cart of claim 1 further comprising a corner rod removably connected to the top and bottom of the cart at each of the four corners thereof.

9. The food tray of claim 8, further comprising a first door hingedly connected to one of the corner rods, and a second door connected to one of the corner rods, such that the first door and the second door are on opposing sides, so that the cart comprises a pass through cart.

10. A food tray cart comprising:
    a top plate;
    a base;
    first and second interchangeable side panels;
    a plurality of corner posts removably connected to the top plate and base, wherein the interchangeable side panels are slidably and removably received in the corner posts;
    a rear panel, slidably and removably received in the corner posts at the rear of the food tray cart; and
    interchangeable shelf panels configured to support a plurality of shelves, the interchangeable shelf panels removably connected to an interior of the food tray cart by a retaining clip, and the interchangeable shelf panels removable without removal of any other components of the food tray cart.

11. The cart of claim 10, further comprising a door hingedly connected at one of the corners of the cart, wherein the door will rotate at least about 270 degrees.

12. The cart of claim 11, wherein the door is hingedly connected to a hinge rod, the hinge rod being removably connected to the top plate and base.

* * * * *